A. W. MEEK.
STATION INDICATOR.
APPLICATION FILED DEC. 29, 1917.

1,295,554.

Patented Feb. 25, 1919.
3 SHEETS—SHEET 1.

WITNESSES
Jas. K. McCathran
F. T. Chapman

INVENTOR
Adam W. Meek,
BY
ATTORNEY

A. W. MEEK.
STATION INDICATOR.
APPLICATION FILED DEC. 29, 1917.

1,295,554.

Patented Feb. 25, 1919.
3 SHEETS—SHEET 2.

WITNESSES
Jas. E. McCathran
H. T. Chapman

INVENTOR
Adam W. Meek,
BY E. G. Siggers
ATTORNEY

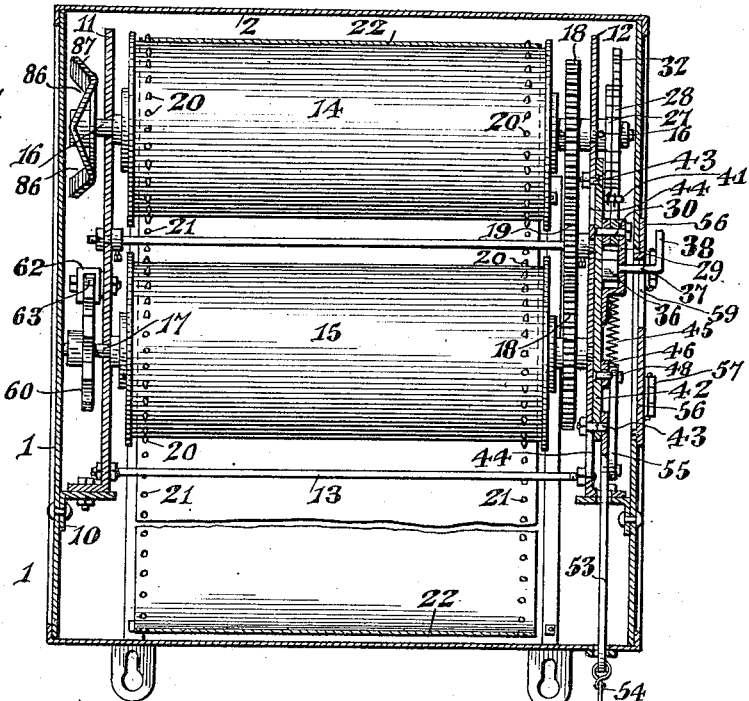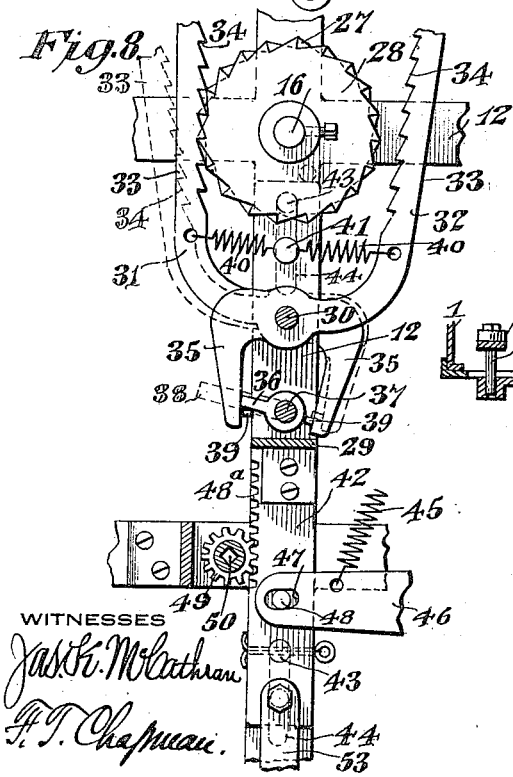

UNITED STATES PATENT OFFICE.

ADAM WHITE MEEK, OF MASCOT, TENNESSEE.

STATION-INDICATOR.

1,295,554.  Specification of Letters Patent.  Patented Feb. 25, 1919.

Application filed December 29, 1917. Serial No. 209,508.

*To all whom it may concern:*

Be it known that I, ADAM W. MEEK, a citizen of the United States, residing at Mascot, in the county of Knox and State of Tennessee, have invented a new and useful Station-Indicator, of which the following is a specification.

This invention has reference to station indicators, and its object is to provide an indicator of metal construction capable of operation automatically or manually to exhibit the names of stations along the line of travel of a vehicle in accordance with said travel, and also to display advertising placards or other information intermittently.

The invention is an improvement upon the station indicator shown and described in Letters Patent No. 1,179,206 granted to me April 11, 1916.

In accordance with the present invention, the efficiency of the indicator described in the aforesaid patent is increased, the relations of parts are changed toward such end, and the device is made simpler and capable of being more readily manufactured than before.

The present invention has the names of stations arranged upon an endless band propelled by connected rollers or drums and contained within a suitable casing so that but one name is seen at a time, and such name is exhibited in a manner to be easily read by passengers at a lower level than the indicator but without the necessity of tipping the indicator. Improved mechanism is provided for changing the course of travel of the name band when the vehicle shall reach the end of the route and start back over the same route, but in the reverse direction. Improved means are provided for displaying advertising matter and for causing a signal for drawing attention to the indicator.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Fig. 7 is a section on the line 7—7 of Fig. 3;

Fig. 8 is a detail view of the actuating and reversing mechanism for the name band; and Fig. 9 is a detail section on the line 9—9 of Fig. 1.

Figure 1:
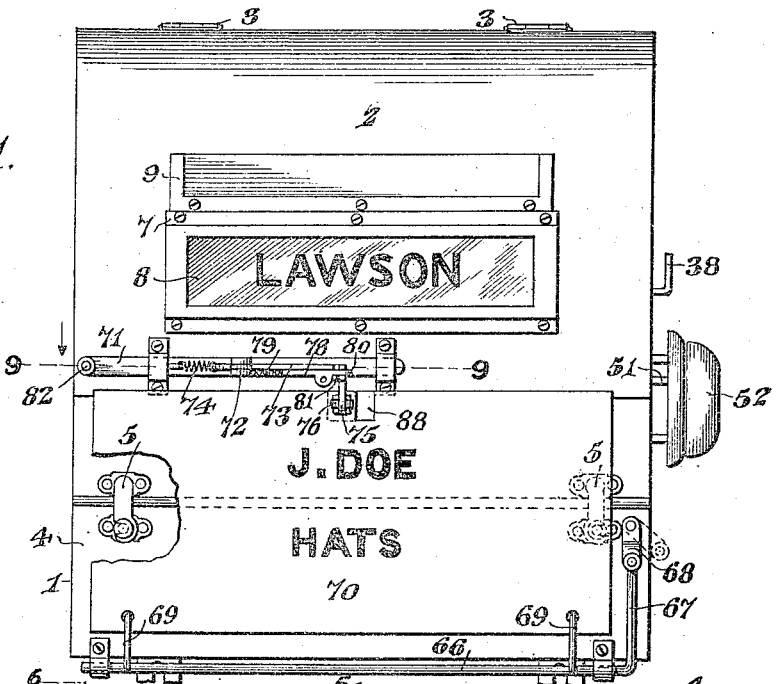
Figure 1 is a front elevation of the indicator with some parts broken away to show more distinct parts.
Figure 2:
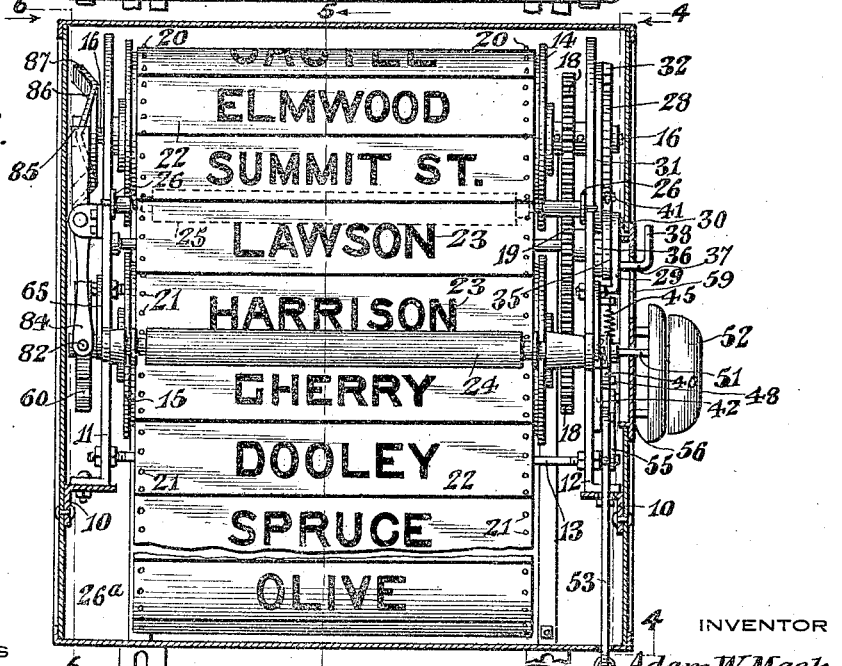
Fig. 2 is a front elevation of the interior mechanism, the casing being shown in section about midway of its depth.

Referring to the drawings, there is shown a casing 1 of appropriate shape and provided with a front section 2 having a hinge connection 3 with the main body of the casing and meeting a short upstanding front section 4 rising from the bottom of the casing. Latches 5 of any appropriate construction serve to hold the front or door portion of the casing in place, but permit its ready unlatching for access to the interior of the casing. The front or door 2 is made sufficiently expansive so that when opened access may be had to interior mechanism for inspection or repairs. This permits some repairs and such cleaning and inspection as may be necessary to be made without the necessity of removing the indicator from its place upon the vehicle.

In the front portion of the door 2 is an elongated opening 6 surrounded by a frame 7 carrying a glass or other transparent pane 8 so that certain parts within the casing may be viewed at any time from the exterior thereof.

Fast to the door 2 above the frame 7 is a receptacle 9 which may be utilized for holding a notice card or for advertising matter.

Within the casing and fast to the end walls thereof are ledges 10 extending from front to rear of the casing and serving as shelves for supporting the interior mechanism.

Such mechanism comprises 2 end frames 11 and 12 which may be generally simple, and which are utilized to carry parts to be described. For the sake of lightness and accessibility of parts, the frames 11 and 12 are made as skeleton frames, and are each of sufficient height to reach nearly to the top of the casing 1. At intervals, the frames are secured together by connecting rods 13 so that the mechanism supporting frame is rendered rigid.

Journaled in the frames 11 and 12 are drums 14 and 15 respectively, these drums being provided with supporting shafts 16 and 17 respectively. Each shaft 16 and 17 has fast thereto a gear wheel 18, and the two gear wheels 18 are coupled together by an intermediate pinion 19, so that the gear wheels, shafts and drums rotate simultaneously in the same direction on driving either shaft.

The drums 14 and 15 occupy the greater part of the space between the sides of the casing 1, and the frames 11 and 12 are located quite close to the inner face of the sides of the casing. Each drum 14 and 15 is provided near its ends with circular series of radial pins 20, so arranged to project through longitudinal series of holes or perforations 21 near opposite edges of an endless band 22 in the form of a web of cloth or other suitable material upon which is produced a series of names 23 which may be the names of the streets crossed by the vehicle upon which the indicator is mounted in traveling its regular route.

The web 22 has the names 23 so arranged on it that they will appear in order back of the window opening 6 and will be seen through the glass pane 8, all other names but the one to be displayed being hidden by the casing 1.

In order to hold the web 22 in operative relation to the drums 14 and 15 and the pins 20 thereon, rollers 24 are mounted in suitable bearings in the frames 11 and 12 and extend across the drum 15 on opposite sides thereof. Another roller 25 is carried by adjustable bearings 26 on the two frames 11 and 12 and extends across the space between the said frames at a point somewhat above the opening 6 and quite close to the front of the casing. The web or belt 22 is carried from the drum 14 in a downward direction over and partly about the roller 25, which becomes a direction changing roller, so as to be brought quite close to the glass pane or window. From this point, the web or belt slants rearwardly and downwardly toward the drum 15, and is held in close relation to the face of the drum about midway of the height of the latter by the front roller 24 between which and the drum the forward run of the belt moves. The result is that the visible portion of the belt where seen through the window is in slanting relation to an upright plane, and consequently passengers on the vehicle, on viewing the displayed name, see it on the belt in a plane about perpendicular to the line of vision. In this way, the indicator may be elevated at a suitable height, and placed upright without any distortion as seen by the passengers.

The ledges or shelves 10 are placed somewhat above the bottom of the casing and provides a chamber 26 in which that portion of the web or belt 22 below the drum 15 may accumulate, thus permitting the use of a belt of considerably greater length than would be accommodated by the two drums, while liability of misfeeding is prevented by the association of the two rollers 24 with the drum 15. With such a construction, an indicator of relatively small size will be sufficiently large to contain a name belt long enough to contain the names of the intersecting streets along a long line of travel of the vehicle with the names displayed in letters of sufficiently large size to be readily readable from any part of the vehicle.

Secured to the shaft 16 between the end frame 12 and the corresponding end of the casing 1 are ratchet wheels 27 and 28 in close relation one to the other. These ratchet wheels have their teeth reversely arranged, that is, the teeth of one ratchet wheel are pointed oppositely to those of the other ratchet wheel.

Carried in the frame 12 about opposite the pinion 19 is a bracket 29 offstanding from the frame toward the corresponding end of the casing and between this bracket and the frame 12 and supported by both is a bolt or pin 30 constituting a pivot member.

Mounted on the pin 30 are two angle levers 31 and 32 in side by side relation. Each lever 31 and 32 has a long arm 33 with a longitudinal series of teeth 34 thereon in position to engage the teeth of a respective one of the ratchet wheels 27 and 28. On the other side of the pivot 30 from the arm 33 each lever is provided with a shorter arm 35. The two arms 35 are located between the bracket 29 and the frame 12, and receive between them a rock arm 36 on a rock shaft 37 journaled between the bracket 29 and frame 12 and projecting through the corresponding side of the casing to the exterior thereof where the shaft has an angle portion 38 serving as a crank handle permitting the rocking of the shaft by hand. Pins 39 on the arms 35 in the path of the arm 36 limit the rocking movements of the latter.

The levers 31 are each under the control of a spring 40 connected at one end to a respective lever and at the other end to a pin 41 common to both springs and projecting from the frame 12. The tendency of each spring 40 is to draw the arm 33 of the respective lever 31 or 32 toward the respective ratchet wheel 27 or 28, but only one of these arms can be drawn at a time by a spring 40 into engagement with a ratchet wheel because the arm 36 is in the path of a respective one of the arms 35.

While the bracket 29 is supported by the frame 12, it is not directly carried thereby but is made fast to a slide bar 42 extending up and down on the frame. This bar is held at its upper and lower ends by bolts 43 or other suitable means slidable in slots 44 in the frame 12, the slots being of such length as to permit reciprocation of the bar 42 to desired extents.

When the arm 36 is properly adjusted, one of the lever arms 33 is in engagement with the teeth of a ratchet wheel 27 or 28, as the case may be, and the other lever arm 33 is out of engagement with the corresponding ratchet wheel. If now it be considered that the normal position of the slide bar 42 is the uppermost position thereof, then on moving the slide bar downwardly, one of the levers, say the lever 31, will cause a rotation of the drum 14 because of the engagement of the arm 33 of the lever 31 with the appropriate ratchet wheel which may be taken as the ratchet wheel 27. This causes the progressive feed of the name belt in the proper direction which may be taken as downwardly. The portion of the name belt between the two drums remains taut, while the portion of the belt below the drum 15 may be piled up or otherwise disposed within the chamber 26, feeding thereinto from the forward side of the drum 15 and being lifted therefrom by the engagement of the rear side of the drum 15 with the belt.

The extent of movement of the feeding mechanism of the drums is such as to agree with the spacing of the names 23 on the belt 22, so that each feeding movement will bring a new name in sight at the window 8.

The reciprocatory slide or bar 42 is under the control of a spring 45, one end of which is made fast to the frame 12 and the other end to one arm of a bell crank lever 46 pivoted on the frame 12. One arm of the lever 46 has a longitudinal slot 47 near its extremity, the slot being entered by a pin 48 on the bar 42, so that the spring 45 will tend to hold the bar 42 in the elevated position but will yield to superior forces tending to lower the bar. The teeth 34 on the arms 33 of the levers 31 and 32 point downwardly so that a downward travel of the bar 42 causes a feeding of the belt 22 in the manner already described. When the bar 42 is released, the spring 45 lifts the bar to the first position, during which time the teeth 34 of the active lever 31 or 32, as the case may be, ride idly over the teeth of the active ratchet wheel 27 or 28.

One edge of the bar 42 is provided with rack teeth 48ᵃ in mesh with a pinion 49 mounted on an appropriate portion of the frame 12. This pinion has a square or other suitably shaped opening 50 for the reception of an arbor 51 extending through the corresponding end of the casing 1 and entering a bell 52 where the arbor may be assumed to actuate bell-striking mechanism of common form and hence needing neither special showing nor description. The bell is located outside of the casing at a relatively low point thereof so as to be readily heard by passengers in the vehicle. The bell is caused to ring every time the indicator is actuated, thus inducing passengers to observe the indicator and be thereby apprised of the street being approached.

In order to actuate the bar 42 there is a link 53 connected to the lower end of the bar and extending downwardly through the bottom of the casing 1 where the strand 54 may be attached to it and carried to a suitable point of manipulation, as for instance, to a point within easy reach of the conductor of the vehicle. In addition to the link 53 another link 55 is made fast to that arm of the bell crank lever 46 remote from that connected to the bar 42, and this link 55 may be carried through the back of the casing and be arranged for ready manipulation by the operator of the vehicle. Both means of manipulation of the street indicator may be incorporated in the same structure, or either means may be employed. Either link 53 or 55 may be used for the attachment of automatic means for operating the indicator, but as no special automatic means is included in the invention, it is deemed unnecessary to show such means, since there are various known means which may be utilized for the purpose.

In order to give ready access to the actuating mechanism for the indicator, that end of the casing carrying the bell is provided with a door 56 carried by hinges 57 and provided with a latch 58. The door has the bell 52 directly mounted thereon and is also provided with a slot 59 through which the rock shaft 38 projects.

In order to prevent overrunning of the name band when being actuated, the drum shaft 17 has a notched wheel 60 fast thereon. This notched wheel is adjacent to the frame 11, and pivoted on said frame is an arm 61 having at the end remote from the pivot opposed ears 62 so arranged as to embrace the wheel 60. These ears support between them a roller 63 of a size to drop into the notches of the wheel 60, thus constituting the arm 61 with the parts carried thereby a readily yieldable latch irrespective of the direction of rotation of the wheel 60. A spring 64 fast at one end to the arm 61 and at the other end to the frame 11 aids in maintaining the latch 61 in engagement with the wheel 60.

The rollers 24 are held in place by gravity latches 65 so that these rollers may be taken out or replaced at will, thereby facilitating changing or adjusting of the name band.

A station indicator provides an excellent means for advertising purposes, and since the indicator is operated at frequent intervals, advertising placards may be exhibited in succession by the operation of the indicator.

To accomplish this, a shaft 66 is journaled at the bottom of the front portion of the casing 1, and is provided at one end with an angle arm 67 in the path of which there is provided a pivoted button 68 on the casing, so that the shaft 66 may be secured in one position or released from such position for the rocking of the shaft. On the shaft 66 are curved fingers 69 which, when the arm 67 is confined by the button 68, engage the front of the casing. These fingers 69 are designed to carry a stack of cards 70, each of which cards may contain suitable advertising matter.

Figure 3:
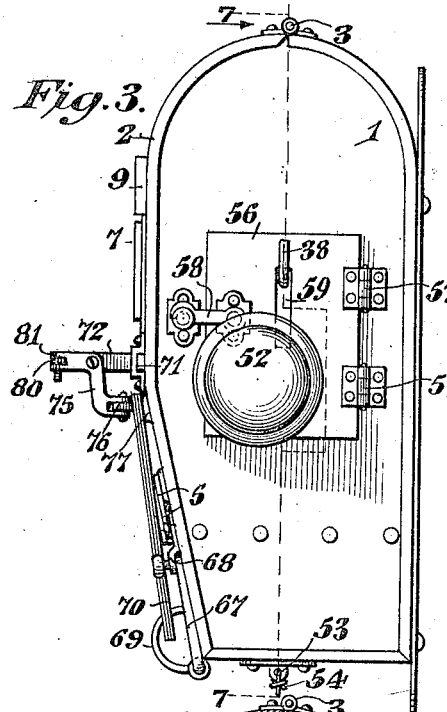
Fig. 3 is an elevation of the right hand end of Fig. 1.
Figure 4:
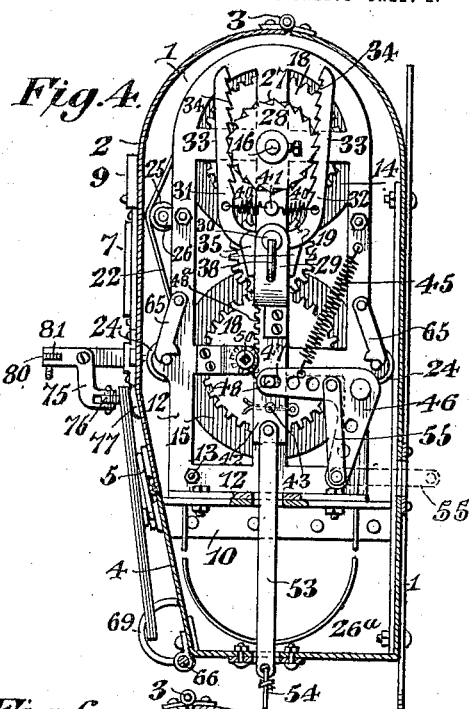
Fig. 4 is a section on the line 4—4 of Fig. 2.
Figure 5:
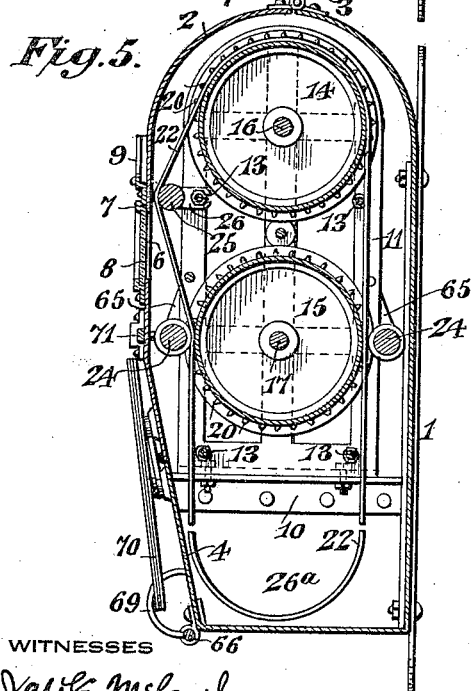
Fig. 5 is a section on the line 5—5 of Fig. 2.
Figure 6:
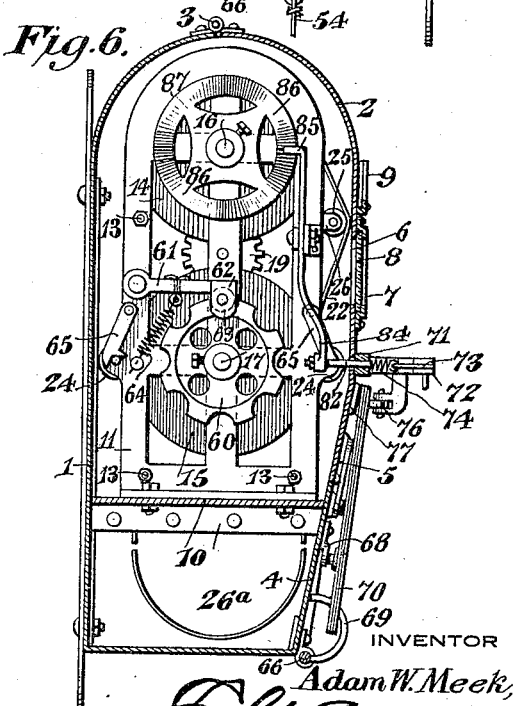
Fig. 6 is a section on the line 6—6 of Fig. 2.

The cards, before being released, stand upright from the fingers 69 and cover the lower portion of the casing 1 beneath the window 8. In order to hold the cards in the upstanding position and to release them in order, a narrow slide 71 is mounted on the front of the casing above the cards. This slide, which is best shown in Figs. 1 and 9 and also appears in Fig. 3 and others of the figures, carries a post 72 on which is mounted a lever 73 having one end connected to one end of a spring 74 fast to the slide and at the other end carrying another lever 75 supporting a roller 76 in position to ride over a wear plate 77 on the face of the casing. The lever 73 also carries a latch 78 controlled by a spring 79 and having a nose end 80 engaging in a notch 81 in the end of the lever 75 remote from the roller 76.

That end of the slide 71 remote from the roller 76 carries a pin 82 projecting through a slot 83 in the casing to the interior thereof. The pin 82 is made fast to one end of a lever 84 mounted on the frame 11, and at the end remote from the pin 82 terminating in an angle extension 85 engaging a tortuous or wavy face 86 formed on a disk 87 fast to the corresponding end of the shaft 16 of the drum 14. The arrangement is such that, on the rotation of the drum 14, which rotation is participated in by the disk 87, rocking movement is imparted to the lever 84, and this in turn causes the slide 71 to reciprocate.

The roller 76 bears against the stack of cards 70, which cards have alternately arranged notches 88 large enough for the passage of the roller 76, which latter is in offset relation to the lever 73, since the lever 75 is an angle lever.

The cards 70 may have advertising matter on both faces. If the parts be arranged as shown in Fig. 1, one face of a card 70 is displayed. Then, on the next actuation of the station indicator, the roller 76 is brought into register with a notch 88, thus releasing the card, and as the latter normally tips forwardly it will gravitate to a pendant position on the fingers 69, thus displaying the advertisement on the other face and also displaying the advertisement on the next card in order. The next time the station indicator is actuated, the roller 76 returns to its first position into register with a notch 88 on the next card in order, which notch is in staggered relation to the cards in front of and behind it.

The number of cards in the stack may correspond to the number of names on the name belt or band 22, so that when the end of the route is reached and the indicator is reset to operate in the opposite direction, the cards may be all returned to the upper position for automatic display on the return trip.

What is claimed is:—

1. A station indicator comprising a suitable casing with a window therein, a band or web for the display of station names at the window, carrying drums for the band or web located within the casing above and below the window, a guide roller within the casing above and close to the window side of the casing and in spaced relation to the upper roller, and another guide roller below the window and adjacent to the lower drum, the upper guide roller being located behind the band or web and the lower guide roller being located in front of said band or web, whereby that portion of the band or web visible through the window travels in a plane substantially perpendicular to the line of observation when the indicator is in an upright position and the eye of the observer is below the level of the window.

2. A station indicator comprising a suitable casing with a window therein, a band or web for the display of station names at the window, carrying and actuating drums for the band or web located within the casing above and below the window, guiding means for the band or web located above the window behind the band or web, and other guiding means for the band or web located below the window in front of the band or web, whereby that portion of the band or web visible through the window travels in a plane substantially perpendicular to the line of observation when the indicator is in an upright position and the eye of the observer is below the level of the window.

3. A station indicator comprising a suitable casing with a window therein, a band or web for the display of station names at the window, carrying drums for the band or web located within the casing one above the window and the other below the window, each drum having circular series of pins and the band or web having marginal series of perforations for receiving the pins, means for actuating the drums to propel the web, and guide rollers one located above the window and the other below the window, with the roller above the window engaging behind the web and the roller below the window engaging in front of the web to hold said web against the lower guide roller in the path of the pins.

4. A station indicator comprising a suitable casing with a window therein, an endless band or web for the display of station names at the window, said band or web having marginal series of perforations, carrying drums within the casing for the band or web, one drum being located above the window and the other below the window and each drum having marginal series of projecting pins for entering the perforations in the band or web, and the drums being both elevated above the bottom of the casing to provide a storage space for excess length of the band or web during the operation of the indicator, a guide roller within the casing adjacent to the window side of the casing above the window and located behind the band or web, and other rollers adjacent to the lower drum and below the window and each engaging the band or web on the face thereof remote from the lower drum to hold the band or web in engagement with the drum with the excess length of the band below said lower drum.

5. A station indicator comprising a casing, spaced connected drums within the casing, a web or band for the display of station names and carried by and driven by the drums, opposed ratchet wheels fast on one of the drums, a reciprocatory bar, and opposed crossed levers carried by the bar and having a common pivotal mounting thereon, each lever having an arm on one side of the pivot with a longitudinal series of teeth to engage a respective ratchet wheel and another arm on the other side of the pivot with the second named arms in opposed relation, and a rock arm between the second-named arms of the levers and movable into engagement with one or the other of said lever arms to hold the toothed end of the engaged lever out of engagement with the respective ratchet wheel.

6. A station indicator comprising a suitable casing, a web or band for displaying station names, carrying drums in the casing for the band, and means for propelling the drums comprising ratchet wheels fast to one of the drums and having their teeth oppositely directed, a reciprocatory bar, crossed levers mounted on the bar and each having one arm provided with a longitudinal series of ratchet teeth to engage a respective one of the ratchet wheels and the other arms of the levers being in opposed relation, means constraining the toothed arms of the levers to approach the ratchet wheels and the other arms of the levers to approach each other, a rock arm accessible from the exterior of the casing for movement into engagement with one or the other of the second-named lever arms to move the corresponding toothed end of the same lever out of engagement with its ratchet wheel, and stops in the path of the second-named lever arms for turning the extent of movement of the corresponding lever away from the respective ratchet wheel.

7. A station indicator comprising a suitable casing with a window therein, a band or web for the display of station names at the window, carrying drums for the band or web located within the casing, actuating means for the drums to move the web into different display positions with respect to the window, a door in the casing for access to the interior thereof, a bell mounted on the door and movable therewith, and sounding connections between the drum actuating mechanism and the bell and extending through the door, whereby when the door is closed the bell will be sounded when the band or web is moved for the display of station names.

8. A station indicator comprising a suitable casing with an inspection opening at one side and a door for closing said opening, a web or band within the casing for the display of station names, carrying drums for the web or band, two-way actuating means for the carrying drums, a slidable bar on which the two-way actuating means is mounted, a rockable device on the bar for setting the actuating means to operate in one or the other of the two ways, and manipulating means for the setting means extending to the exterior of the casing through the door, said door having a slot, for the passage of the manipulating means therethrough, elongated in the direction of the travel of the bar.

In testimony, that I claim the foregoing as my own, I have hereto affixed my signature in the presence of two witnesses.

ADAM WHITE MEEK.

Witnesses:
B. M. DOYLE,
W. M. McKINNEY.

Copies of this patent may be obtained for five cents each, by addressing the "Commissioner of Patents, Washington, D. C."